Dec. 6, 1927.
C. J. DUDLEY ET AL
1,651,381
BASKET COVER FASTENER
Filed Jan. 14, 1925
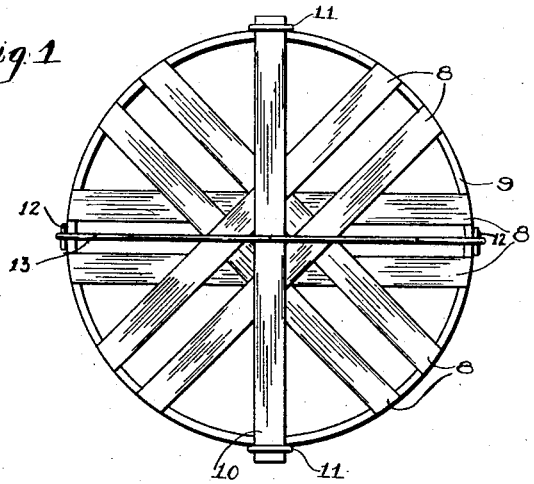
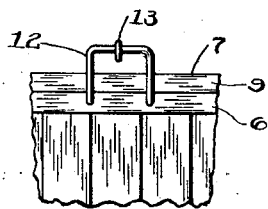
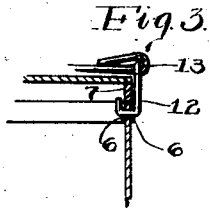
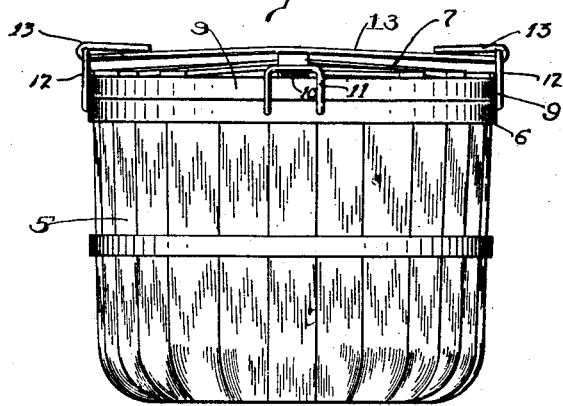
Inventor
Colon J. Dudley and
Mason H. Holmwood
by J. W. Ellis
Attorney.

Patented Dec. 6, 1927.

1,651,381

UNITED STATES PATENT OFFICE.

COLON J. DUDLEY, OF HAMBURG, AND MASON H. HOLMWOOD, OF ORCHARD PARK, NEW YORK.

BASKET-COVER FASTENER.

Application filed January 14, 1925. Serial No. 2,251.

Our invention relates in general to basket cover fasteners, and particularly to fasteners which are used in connection with the closures of bushel basket.

It is well known to those skilled in the art that when bushel baskets are filled, for instance, with fruit that when pressure is exerted at two diametrically opposite points, the points which are at right angles to the points of pressure will bulge outwardly, thus bruising or otherwise injuring the fruit, as well as providing an opening through which fruit may be taken.

The principal object of our invention has been to overcome the disadvantages above enumerated, and to provide fastening means for securely holding the covers of baskets in place, which shall prevent bulging and unauthorized access to the contents of the basket.

Another object has been to provide fastening means of this nature which shall be convenient and inexpensive to assemble.

The above objects and advantages have been accomplished by the device shown in the accompanying drawings, of which:

Fig. 1 is a plan view showing the top of a bushel basket with our fastening means in place.

Fig. 2 is a side view thereof.

Fig. 3 is a fragmentary, sectional view of our device.

Fig. 4 is a fragmentary face view of the basket showing a front view of one of the fastening staples.

In the drawings, 5 represents the usual bushel basket having the customary body and rims or hoops 6 arranged at the inside and outside of its upper edge which are, as is customary fastened in place by staples or otherwise. 7 represents the cover of the basket which is preferably formed of interspaced slats 8. These slats are fastened to the cover rim 9 by any suitable means. A handle engaging slat 10 is also secured to the cover, and its ends project beyond the rim 9 thereof, and engage with the usual wire handles 11 provided on the basket and arranged in the customary diametrically opposite position. This slat is of such a length that it may be sprung under the handle when the cover is placed in position. Carried by the bushel basket are two staples 12 which are arranged diametrically opposite to each other and preferably midway the handles 11. These staples have their lower ends passed through the rims 6 of the basket where they are clinched as shown in Fig. 3. They are of such a length that they extend upwardly to a point a little above the top of the basket cover 7. Flexible means comprising preferably a fastening wire 13 is placed across the basket and its ends run through the staples 12 whereupon they are turned back as shown in Fig. 3, whereby the staples 12 are held together, and, therefore, the sides of the basket are prevented from bulging. The wire 13 is preferably of such a gage that the ends thereof may be bent over by hand and yet be sufficiently strong to prevent opening under tension produced by the bulging tendency of the basket.

From the foregoing, it will be clear that, when our fastening means are used, the cover of the basket will be held securely in place and the sides of the basket will be securely tied together whereby all bulging and loss by crushing and pilfering will be substantially prevented.

Obviously, some modifications of the details herein shown and described may be made without departing from the spirit of our invention, or the scope of the appended claim, and we do not, therefore, wish to be limited to the exact embodiment herein shown and described, the forms herein shown and described being merely preferred forms thereof.

Having thus described our invention, what we claim is:

The combination with a basket of a cover fastener comprising two diametrically opposite handles carried by the basket and two diametrically opposite staples projecting above the upper edge of the basket arranged equidistantly between the handles, a rigid slat secured to the cover and having its ends engageable with the handles, and a wire bearing upon the slat and passing through the staples and having its ends bent over the staples in locking relation to maintain the cover against displacement.

In testimony whereof, we have hereunto signed our names.

COLON J. DUDLEY.
MASON H. HOLMWOOD.